United States Patent
Ezepov

(10) Patent No.: US 10,552,505 B2
(45) Date of Patent: Feb. 4, 2020

(54) METHOD AND SYSTEM FOR GENERATING A USER-PERSONALIZATION INTEREST PARAMETER FOR IDENTIFYING PERSONALIZED TARGETED CONTENT ITEM

(71) Applicant: YANDEX EUROPE AG, Lucerne (CH)

(72) Inventor: Ilya Sergeevich Ezepov, Tver (RU)

(73) Assignee: YANDEX EUROPE AG, Lucerne (CH)

(*) Notice: Subject to any disclaimer, the term of this patent is extended or adjusted under 35 U.S.C. 154(b) by 171 days.

(21) Appl. No.: 15/915,609

(22) Filed: Mar. 8, 2018

(65) Prior Publication Data

US 2019/0034535 A1    Jan. 31, 2019

(30) Foreign Application Priority Data

Jul. 25, 2017 (RU) .................... 2017126525

(51) Int. Cl.
```
G06F 16/9535    (2019.01)
G06F 16/955     (2019.01)
G06N 20/00      (2019.01)
G06Q 30/02      (2012.01)
```
(52) U.S. Cl.
CPC ...... G06F 16/9535 (2019.01); G06F 16/9566 (2019.01); G06N 20/00 (2019.01); G06Q 30/0255 (2013.01); G06Q 30/0277 (2013.01)

(58) Field of Classification Search
CPC ...... G06F 17/30; G06F 17/18; G06F 16/9535; G06N 5/02
See application file for complete search history.

(56) References Cited

U.S. PATENT DOCUMENTS

| 6,134,532 A | 10/2000 | Lazarus et al. |
|---|---|---|
| 2006/0136589 A1 | 6/2006 | Konig et al. |
| 2010/0313139 A1 | 12/2010 | Watfa et al. |

(Continued)

FOREIGN PATENT DOCUMENTS

| RO | 131695 A2 | 2/2017 |
|---|---|---|
| RU | 2435212 C2 | 11/2011 |

OTHER PUBLICATIONS

Search Report with regard to the counterpart RU Patent Application No. 2017126525 completed Mar. 21, 2019.

(Continued)

*Primary Examiner* — Etienne P Leroux
(74) *Attorney, Agent, or Firm* — BCF LLP

(57) ABSTRACT

A computer implemented method of generating a user-personalization interest parameter is disclosed. The method comprises receiving, navigational history data associated with a browser application; generating, one or more navigational session transition patterns; for each navigational session transition pattern: truncating, each of the one or more URLs included within the navigational session transition pattern, to obtain a respective URL segment; generating, a respective vector value representative for each of the URL segments; assigning a weight value for each URL segments; determining a navigational profile value for the user, based on at least one vector value and the associated weight value; generating, the user-personalization interest parameter associated with the user based on the navigational profile value.

20 Claims, 7 Drawing Sheets

(56) References Cited

U.S. PATENT DOCUMENTS

2011/0225192 A1\* 9/2011 Imig .................. G06F 16/9535
   707/775
2016/0343056 A1 11/2016 Hu et al.

OTHER PUBLICATIONS

English Abstract of RO131695 retrieved on Espacenet on Aug. 16, 2017.

\* cited by examiner

| No. | Unique browser ID 140 | |
|---|---|---|
| | Set of URLs 304 | Access time 306 |
| 1. | www.aaa.com | 2017-05-19 8:23:56 |
| 2. | www.bbb.com | 2017-05-19 8:25:01 |
| 3. | www.ccc.com | 2017-05-19 8:28:45 |
| 4. | www.ddd.com | 2017-05-19 8:30:27 |
| 5. | www.eee.com | 2017-05-19 12:59:37 |
| 6. | www.fff.com | 2017-05-19 13:01:55 |
| 7. | www.ggg.com | 2017-05-19 14:30:02 |
| 8. | www.hhh.com | 2017-05-19 19:01:15 |
| 9. | www.iii.com | 2017-05-19 19:01:55 |
| 10. | www.jjj.com | 2017-05-19 19:03:45 |
| 11. | www.kkk.com | 2017-05-19 19:05:25 |
| 12. | www.lll.com | 2017-05-20 6:23:45 |
| 13. | www.mmm.com | 2017-05-20 6:28:21 |
| 14. | www.nnn.com | 2017-05-20 6:28:45 |

FIG. 3

| | 502 | |
|---|---|---|
| | | |
| 1. | www.aaa.com __504__ | 2017-05-19 8:23:56 |
| 2. | www.bbb.com __506__ | 2017-05-19 8:25:01 |
| 3. | www.ccc.com __508__ | 2017-05-19 8:28:45 |
| 4. | www.ddd.com __510__ | 2017-05-19 8:30:27 |

| | 512 | |
|---|---|---|
| 5. | www.eee.com | 2017-05-19 12:59:37 |
| 6. | www.fff.com | 2017-05-19 13:01:55 |

| | 514 | |
|---|---|---|
| 7. | www.ggg.com | 2017-05-19 14:30:02 |

| | 516 | |
|---|---|---|
| 8. | www.hhh.com | 2017-05-19 19:01:15 |
| 9. | www.iii.com | 2017-05-19 19:01:55 |
| 10. | www.jjj.com | 2017-05-19 19:03:45 |
| 11. | www.kkk.com | 2017-05-19 19:05:25 |

| | 518 | |
|---|---|---|
| 12. | www.lll.com | 2017-05-20 6:23:45 |
| 13. | www.mmm.com | 2017-05-20 6:28:21 |
| 14. | www.nnn.com | 2017-05-20 6:28:45 |

FIG. 5

METHOD AND SYSTEM FOR GENERATING A USER-PERSONALIZATION INTEREST PARAMETER FOR IDENTIFYING PERSONALIZED TARGETED CONTENT ITEM

CROSS-REFERENCE

The present application claims priority to Russian Patent Application No. 2017126525, filed Jul. 25, 2017, entitled "Method And System For Generating A User-Personalization Interest Parameter For Identifying Personalized Targeted Content Item," the entirety of which is incorporated herein by reference.

FIELD

The present technology generally relates to systems and methods for determining a user-personalization interest parameter, and, in particular, to methods and systems for identifying personalized targeted content item based on the user-personalization interest parameter.

BACKGROUND

Various global or local communications networks (the Internet, the World Wide Web, local area networks and the like) offer a user a vast amount of information. Generally speaking, a given user can access a web resource via a communication network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

With the growth of the number of users accessing the Internet, as well as the growth of the number of web resources available in the Internet, content recommendation systems have emerged for providing content recommendations to the users. These applications automate the process of providing personalized recommendations for content, other web resources, and services that might be of interest to the user.

However, the overwhelming volume of targeted content items available, as well as the scarce information about the user, make it difficult for the content recommendation application to choose which targeted content item the user would be more interested in.

Generally speaking, there exist several computer-based approaches for implementing the targeted content item delivery application. A common approach is to associate a user with a group other users who share the same interests as the user and then recommending a targeted content item enjoyed by others in the group. This approach can be broadly classified as "look alikes", which is based on a fundamental premise that users having similar characteristics are likely to enjoy similar content. Such an approach would collect the activity history for a plurality of users and train a singular value decomposition (SVD) algorithm used to associate a user profile to a group.

While such an approach may be useful, it also has several downsides. For example, a large amount of activity history is required for building reliable profiles, and as a result, training the SVD algorithm can be very expensive in terms of computing resources.

US 2016/343056 (published on Nov. 24, 2016) discloses a computer-implemented method for recommending items for future purchase by a consumer based on the consumer's historical actions is provided. The method is implemented using an adaptive recommendation ("AR") computer device in communication with a memory. The method includes receiving from a recommender server computing device at least one preference vector, storing the at least one preference vector, receiving at least one consumer action including a time aspect, from a candidate consumer, and determining at least one personalized vector based on the at least one preference vector, the at least one consumer action, and the time aspect associated with each of the at least one consumer action. The at least one personalized vector represents at least one future purchase that the candidate consumer will likely conduct. The method also includes displaying at least one recommendation to the candidate consumer based on the at least one personalized vector.

U.S. Pat. No. 6,134,532 (published on Oct. 17, 2000) discloses a system and method for selecting and presenting personally targeted entities such as advertising, coupons, products and information content, based on tracking observed behavior on a user-by-user basis and utilizing an adaptive vector space representation for both information and behavior. The system matches users to entities in a manner that improves with increased operation and observation of user behavior. User behavior and entities (ads, coupons, products) and information (text) are all represented as content vectors in a unified vector space. The system is based on an information representation called content vectors that utilizes a constrained self organization learning technique to learn the relationships between symbols (typically words in unstructured text). Users and entities are each represented as content vectors.

SUMMARY

It is an object of the present technology to provide improved method and system for determining user-personalization interest parameter for targeted content item recommendation. As such, it will be apparent to those skilled in the art that the present technology aims at determining the user-personalization interest parameter for identifying one or more targeted content items in a more efficient manner, thus improving energy consumption and decreasing computational burden on the servers associated with the content recommendation applications.

In developing the present technology, developers noted that a growing number of web resources accessible by the browser applications associated with the users are serviced by web analytic services (such as Google Analytics™, and Yandex Metrica™, and the like). Briefly speaking, these web analytic services are configured to collect and store data associated with the browser application and/or user interactions with the associated web resource via the browser application.

Without wishing to be bound to any specific theory, embodiments of the present technology have been developed based on an assumption that by assessing the browsing/navigational history of the browser application accessing a web service, a "profile" of the user (represented as the user-personalization interest parameter) associated with the browser application can be generated. The profile can be generated, at least in part, based on the browsing/navigational history and, more specifically, based on the URLs (or portions thereof) of the web resources visited during the browsing/navigational interaction of the user and the web resources. This profile could in turn be used to determine which targeted content items will fall within the interest of the user and which targeted content items should be presented to the user during future browsing activities (in a form of content recommendations, personalized content items, ads, and the like).

According to a broad aspect of he present technology, there is provided a computer implemented method of generating a user-personalization interest parameter, the method being executable on a server coupled to, via a communication network, a client device associated with a user, the client device configured to execute a browser application having previously accessed, via the communication network, at least one web resource during a pre-determined past period of time; the method comprising: receiving, by the server, navigational history data associated with the browser application, the navigational history data including one or more uniform resource locators (URLs) associated to a respective one of the at least one web resources; generating, based on the navigational history data, one or more navigational session transition patterns, a given navigational session transition pattern including at least one of the one or more URLs accessed by the browser application during a given past browsing session; for each navigational session transition pattern: truncating, each of the one or more URLs included within the navigational session transition pattern, to obtain a respective URL segment; generating, by a first machine learning algorithm, a respective vector value representative for each of the URL segments; the first machine learning algorithm having been trained to map the URL segments to respective vector values based on a co-occurrence of the URL segments within the navigational session transition pattern; assigning a weight value for each URL segments, wherein for a given URL segment, the weight value being determined based on at least one of a first value being inversely proportional to a frequency of the given URL segment in a log of URL segments associated with URLs visited by users of the server; a second value being based on a recentness of access to the URL associated with the given URL segment by the browser application; determining a navigational profile value for the user, based on at least one vector value and the associated weight value, the navigational profile value being associated with the user's navigational history data over a pre-determined period of time; generating, by a second machine learning algorithm, the user-personalization interest parameter associated with the user based on the navigational profile value, the second machine learning algorithm having been trained to map a user's navigational profile value to at least one user-personalization interest parameter.

In some embodiments of the method, truncating each of the one or more URLs comprises discarding at least one of: a first portion indicative of a hypertext transfer protocol for each of the one or more URLs; a second portion indicative of a path name for each of the one or more URLs; a third portion indicative of a file name for each of the one or more URLs; a fourth portion indicative of a top-level domain name for each of the one or more URLs; and a fifth portion indicative of a hostname, upon determination that the hostname is a world wide web (www) hostname.

In some embodiments of the method, the navigational history data further comprises an access time for each of the one or more URLs by the browser application, the one or more URLs having been previously stored in an order in accordance with the access time resulting in a list of URLs being chronologically organized.

In some embodiments of the method, generating the one or more navigational session transition patterns comprises parsing the chronologically sorted one or more URLs into the one or more navigational sessions based on its respective access times.

In some embodiments of the method, parsing comprises applying a pre-determined period of time mask.

In some embodiments of the method, the first machine learning algorithm executes a word2vec based algorithm.

In some embodiments of the method, the word2vec based algorithm is trained to project the URL segment into a multi-dimensional space such that the URL segments occurring within the same navigational session transition pattern are projected in proximity to each other in the multi-dimensional space.

In some embodiments of the method, determining the navigational profile value comprises: determining for each vector value associated with the navigational history data, a respective adjusted vector value, the respective adjusted vector value being calculated using an equation:

$$V_{adjusted} = V_{host} \times W \times N$$

where: $V_{adjusted}$ is the adjusted vector value for a given vector value; $V_{host}$ is the given vector value; W is the weight value associated with the given vector value; N is a number of occurrence for the domain level name associated with the given vector value in the navigational history data; and adding each of the determined adjusted vector values to obtain the navigational profile value.

In some embodiments of the method, the user-personalization interest parameter comprises one or more socio-demographic features, the one or more socio-demographic features comprising at least one of: an age range of the user; an income range of the user; a regional position of the user; and gender of the user.

In some embodiments of the method, the server is configured to maintain a web service accessible by the browser application.

In some embodiments of the method, receiving the navigational history data associated with the browser application is executed in response to the browser application accessing the web service.

In some embodiments of the method, the server further comprises a content database, the content database comprising one or more targeted content items, and wherein the method further comprises: determining, based on the user-personalization interest parameter, one or more targeted content items; and transmitting, the one or more targeted content items to the client device for display.

In some embodiments of the method, each of the one or more targeted content items has an associated item feature vector, and wherein determining the one or more targeted content items comprising matching the item feature vectors with the user-personalization interest parameter.

In some embodiments of the method, the matching the item feature vectors with the user-personalization interest parameter comprises projecting the item feature vectors and the user-personalization interest parameter into a second multi-dimensional space and identifying targeted content items located in a pre-determined proximity to the user-personalization interest parameter.

In some embodiments of the method, the one or more targeted content items comprise a banner ad.

In another broad aspect of the present technology, there is provided a server coupled to a client device associated with a user via a communication network, the client device configured to execute a browser application having previously accessed, via the communication network, at least one web resource during a pre-determined past period of time, the server comprising: a network interface for communicatively coupling to the communication network; a processor coupled to the network interface, the processor configured to: receive, by the server, navigational history data associated with the browser application, the navigational history data including one or more uniform resource locators (URLs) associated to a respective one of the at least one web resources; generate, based on the navigational history data, one or more navigational session transition patterns, a given navigational session transition pattern including at least one of the one or more URLs accessed by the browser application during a given past browsing session; for each navigational session transition pattern: truncate, each of the one or more URLs included within the navigational session transition pattern, to obtain a respective URL segment; generate, by a first machine learning algorithm, a respective vector value representative for each of the URL segments; the first machine learning algorithm having been trained to map the URL segments to respective vector values based on a co-occurrence of the URL segments within the navigational session transition pattern; assign a weight value for each URL segments, wherein for a given URL segment, the weight value being determined based on at least one of a first value being inversely proportional to a frequency of the given URL segment in a log of URL segments associated with URLs visited by users of the server; a second value being based on a recentness of access to the URL associated with the given URL segment by the browser application; determine a navigational profile value for the user, based on at least one vector value and the associated weight value, the navigational profile value being associated with the user's navigational history data over a pre-determined period of time; generate, by a second machine learning algorithm, the user-personalization interest parameter associated with the user based on the navigational profile value, the second machine learning algorithm having been trained to map a user's navigational profile value to at least one user-personalization interest parameter.

In some embodiments of the server, to truncate each of the one or more URLs, the processor is configured to discard at least one of: a first portion indicative of a hypertext transfer protocol for each of the one or more URLs; a second portion indicative of a path name for each of the one or more URLs; a third portion indicative of a file name for each of the one or more URLs; a fourth portion indicative of a top-level domain name for each of the one or more URLs; and a fifth portion indicative of a hostname, upon determination that the hostname is a world wide web (www) hostname.

In some embodiments of the server, the navigational history data further comprises an access time for each of the one or more URLs by the browser application, the one or more URLs having been previously stored in an order in accordance with the access time resulting in a list of URLs being chronologically organized.

In some embodiments of the server, to generate the one or more navigational session transition patterns, the processor is configured to parse the chronologically sorted one or more URLs into the one or more navigational sessions based on its respective access times.

In some embodiments of the server, to parse, the processor is configured to apply a pre-determined period of time mask.

In some embodiments of the server, the first machine learning algorithm executes a word2vec based algorithm.

In some embodiments of the server, the word2vec based algorithm is trained to project the URL segment into a multi-dimensional space such that the URL segments occurring within the same navigational session transition pattern are projected in proximity to each other in the multi-dimensional space.

In some embodiments of the server, to determine the navigational profile value, the processor is configured to: determine for each vector value associated with the navigational history data, a respective adjusted vector value, the respective adjusted vector value being calculated using an equation:

$$V_{adjusted} = V_{host} \times W \times N$$

where: $V_{adjusted}$ is the adjusted vector value for a given vector value; $V_{host}$ is the given vector value; W is the weight value associated with the given vector value; N is a number of occurrence for the domain level name associated with the given vector value in the navigational history data; add each of the determined adjusted vector values to obtain the navigational profile value.

In some embodiments of the server, the user-personalization interest parameter comprises one or more socio-demographic features, the one or more socio-demographic features comprising at least one of: an age range of the user; an income range of the user; a regional position of the user; and gender of the user.

In some embodiments of the server, the server is configured to maintain a web service accessible by the browser application.

In some embodiments of the server, in response to the browser application accessing the web service, the processor is configured to receive the navigational history data associated with the browser application.

In some embodiments of the server, wherein the server further comprises a content database, the content database comprising one or more targeted content items, and wherein the processor is further configured to: determine, based on the user-personalization interest parameter, one or more targeted content items; and transmit, the one or more targeted content items to the client device for display.

In some embodiments of the server, each of the one or more targeted content items has an associated item feature vector, and wherein to determine the one or more targeted content items, the processor is configured to match the item feature vectors with the user-personalization interest parameter.

In some embodiments of the server, to match the item feature vectors with the user-personalization interest parameter, the processor is configured to project the item feature vectors and the user-personalization interest parameter into a second multi-dimensional space and identify targeted content items located in a pre-determined proximity to the user-personalization interest parameter.

In some embodiments of the server, the one or more targeted content items comprise a banner ad.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where:

FIG. 3 depicts a schematic illustration of a navigational history data stored within the tracking database of the system of FIG. 1.

FIG. 5 depicts a schematic illustration of a parsed navigational history data by the content delivery application of the system of FIG. 1.

DETAILED DESCRIPTION

Figure 1:
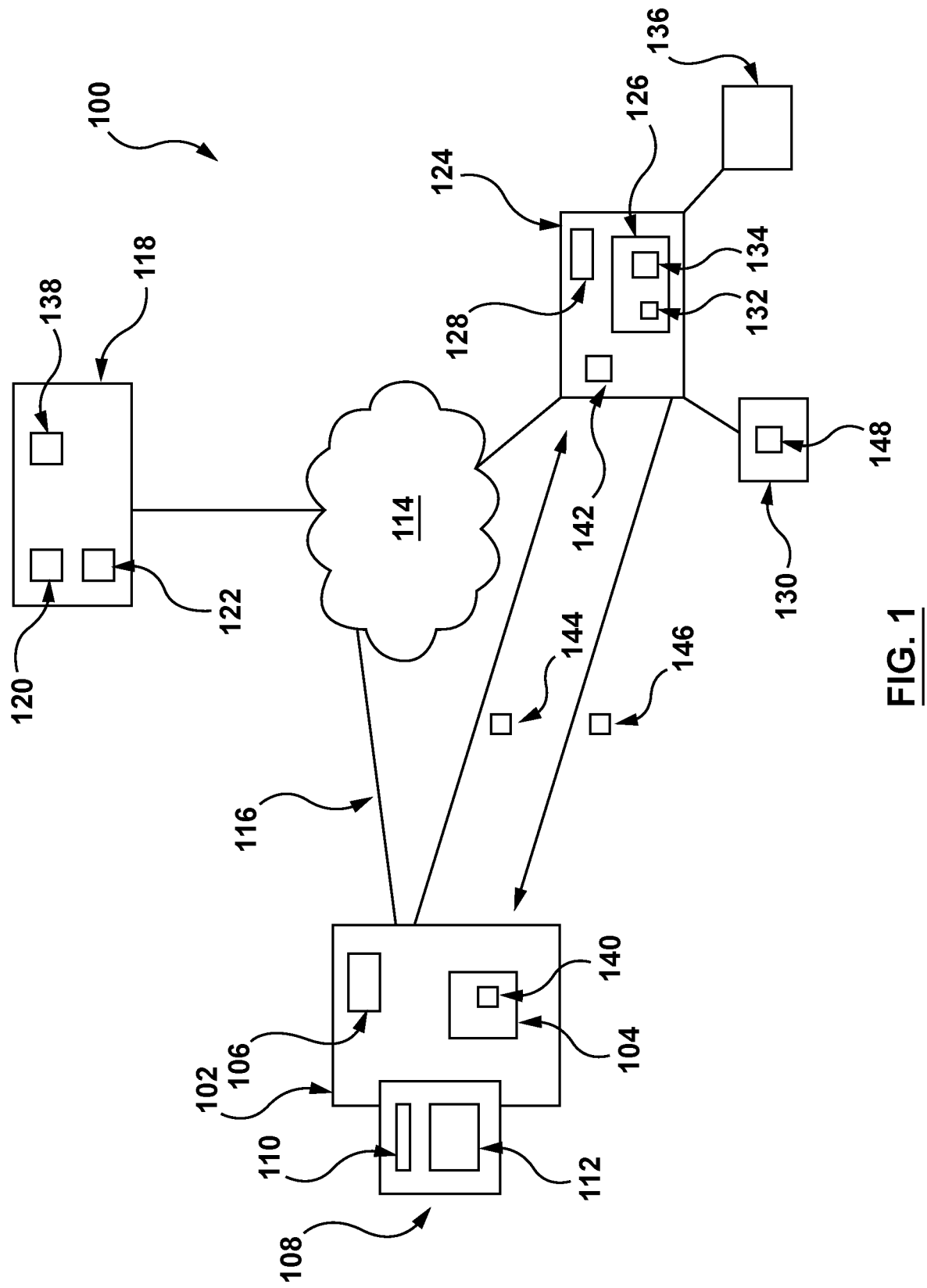
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art to execute a browser application 108. Generally speaking, the purpose of the browser application 108 is to enable the user (not depicted) to access one or more web resources. The manner in which the browser application 108 is implemented is known in the art and will not be described herein. Suffice to say that the browser application 108 may be one of Google™ Chrome™, Yandex.Browser™, or other commercial or proprietary browser applications.

Irrespective of how the browser application 108 is implemented, the browser application 108, typically, has a command interface 110 and a browsing interface 112. Generally speaking, the user (not depicted) can access a web resource via a communication network 114 by two principle means. The given user can access a particular web resource directly, either by typing an address of the web resource (typically an URL or Universal Resource Locator, such as www.example.com) into the command interface 110 or by clicking a link in an e-mail or in another web resource (which action will in a sense "copy and paste" the URL associated with the link into the command interface 110).

Alternatively, the given user may conduct a search using a search engine service (not depicted) to locate a resource of interest based on the user's search intent. The latter is particularly suitable in those circumstances, where the given user knows a topic of interest, but does not know the URL of the web resource he or she is interested in. The user inputs a search query into the command interface 110, the search query being representative of the user's search intent. The search engine typically returns a Search Engine Result Page (SERP) containing links to one or more web resources that are responsive to the user's search query. Again, upon the user clicking one or more links provided within the SERP, the user can open the required web resource.

The electronic device 102 comprises a communication interface (not depicted) for two-way communication with the communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 116 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 116 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116 and the communication network 114. As such, by no means the examples provided hereinabove are meant to limit the scope of the present technology.

The system 100 further includes a web server 118 coupled to the communication network 114. The web server 118 can be implemented as a conventional computer server. In an example of an embodiment of the present technology, the web server 118 can be implemented as a Dell™ PowerEdge™ Server running the Microsoft™ Windows Server™ operating system. Needless to say, the web server 118 can be implemented in any other suitable hardware and/or software and/or firmware or a combination thereof. In the depicted non-limiting embodiment of the present technology, the web server 118 is a single server. In alternative non-limiting embodiments of the present technology, the functionality of the web server 118 may be distributed and may be implemented via multiple servers.

The implementation of the web server 118 is well known. However, briefly speaking, the web server 118 comprises a communication interface (not depicted) structured and configured to communicate with various entities (such as the electronic device 102 and other devices potentially coupled to the communication network 114) via the communication network 114.

In some embodiments of the present technology, and generally speaking, the web server 118 functions as a "host" for a first web resource 120 and a second web resource 122. In some non-limiting embodiments of the present technology, each of the first web resource 120 and the second web resource 122 represents a network resource (such as a web page, web site or the like), which includes content that is visually presentable by the electronic device 102 to the user, via the browser application 108, and associated with a particular web address (such as a URL).

Each of the first web resource 120 and the second web resource 122 is accessible by the browser application 108 via the communication network 114, for example, by means of the user typing in the URL into the command interface 110 or executing a web search using the search engine service (not depicted). Although in the depicted non-limiting embodiment of the present technology, the web server 118 hosts only two web resources: the first web resource 120 and the second web resource 122, it is not limited as such and, may host more or fewer than two web resources.

The system 100 further includes a server 124 coupled to the communication network 114. Suffice to say that the server 124 can (but does not have to) be implemented in a similar manner to the web server 118. In the depicted embodiments of the present technology, the server 124 is a single server. In alternative non-limiting embodiments of the present technology, the functionality of the server 124 may be distributed and implemented via multiple servers.

The server 124 comprises a server memory 126 having one or more storage media which generally provides a place to store computer-executable program instructions executable by a server processor 128. By way of example, the server memory 126 may be implemented as tangible computer-readable storage medium including Read-Only Memory (ROM) and/or Random-Access Memory (RAM). The server memory 126 may also include one or more fixed storage devices in the form of, by way of example, hard disk drives (HDDs), solid-state drives (SSDs), and flash-memory cards.

In some non-limiting embodiments of the present technology, the server 124 can be operated by the same entity that has provided the afore-described browser application 108. For example, if the browser application 108 is a Yandex.Browser™, the server 124 can be operated by Yandex LLC of Lev Tolstoy Street, No. 16, Moscow, 119021, Russia. In alternative embodiments, the server 124 can be operated by an entity different from the one providing the aforementioned browser application 108.

In accordance with the none-limiting embodiments of the present technology, the server 124 provides a web service 142 (e.g. a personalized content recommendation service such as Yandex.Zen™ or Flipboard™, an online shopping service, a news service, a social media service, and the like) which is accessible by the browser application 108 via the communication network 114, for example, by means of the user typing in the URL associated with the web service 142 into the command interface 110 or executing a web search using the search engine (not depicted). Although in the depicted non-limiting embodiment of the present technology, the server 124 hosts only a single instance of the web service 142, it is not limited as such and, may host more web services.

In some embodiments of the present technology, the server 124 further hosts a web analytic application 134, such as, for example, Yandex.Metrica™ and Google Analytics™. The manner in which the web analytic application 134 is implemented is known, and therefore will not be described at length herein. Suffice to say that the web analytic application 134 is configured to track and store navigational history data (described below) of a given browser application (such as the browser application 108). As such, the web analytic application 134 is in communication with a tracking database 136 (described below). Although the web analytic application 134 is depicted as being implemented within the server 124, it is not limited as such, and may be implemented (together with the tracking database 136) by a different entity.

Populating the Tracking Database 136

Figure 2:
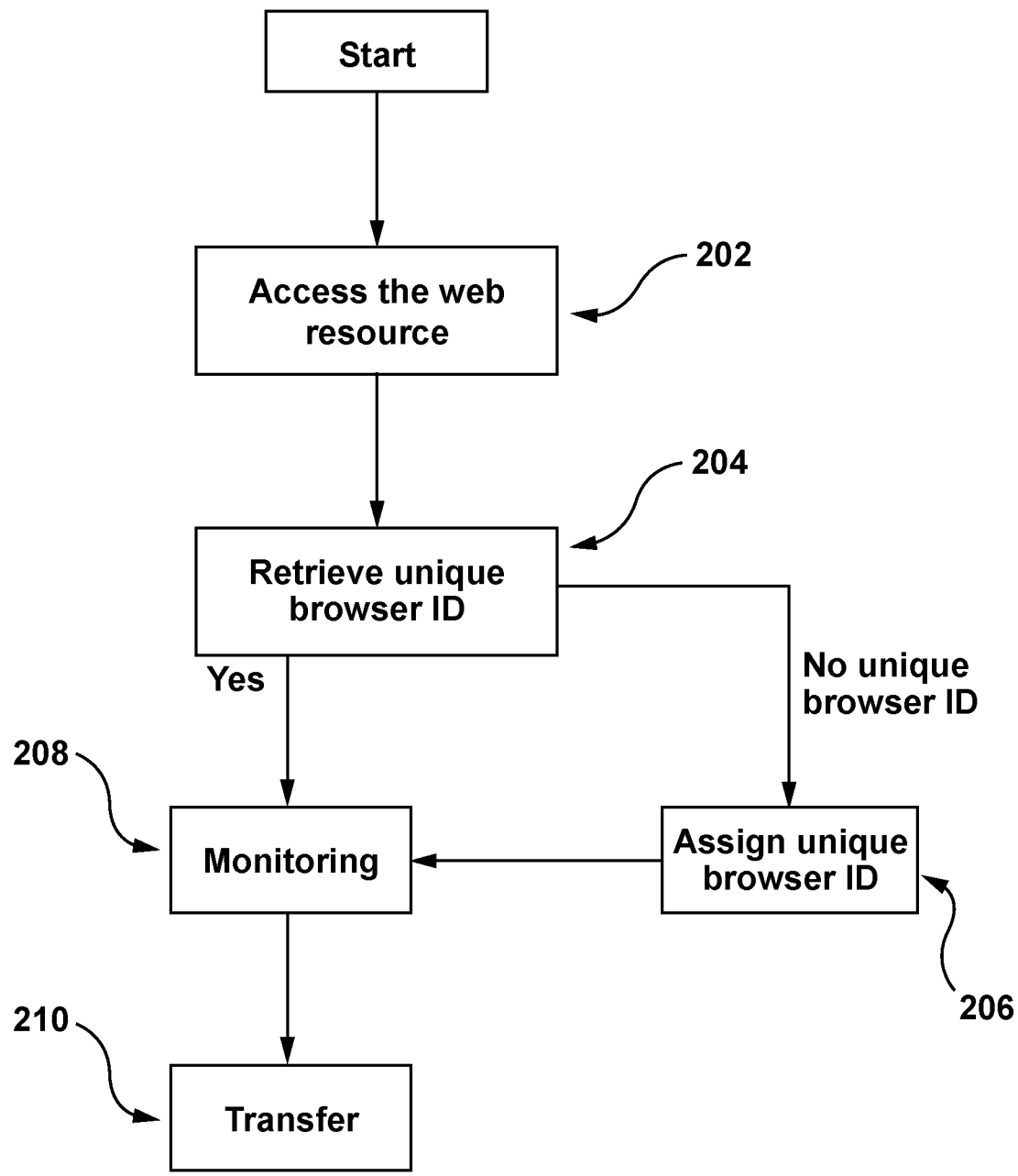
FIG. 2 depicts a flowchart of a procedure for populating a tracking database of the system of FIG. 1.

FIG. 2 depicts a flowchart of a procedure for populating the tracking database 136.

As an illustration, the manner in which the tracking database 136 is populated will be explained using the first web resource 120. It is to be expressly understood that this is done merely as an example, and it is not intended to be limitative. In other words, same approach can be applied to the second web resource 122.

Starting with a general overview, the first web resource 120 may be serviced by the web analytic application 134 by inserting, by a provider of the first web resource 120 (not depicted), a counter code provided by the web analytic application 134 within the web resource contents. Generally speaking, the counter code consists of a JavaScript snippet code placed in the script element of the first web resource 120. However, the counter code can be based on any other code and/or programming language. In response, the web server 118 receives a source code 138 (see FIG. 1) to be stored therein by the web analytic application 134. As it will be explained in more detail below, the source code 138 executes instructions associated with the web analytic application 134.

Now, starting with step 202, the browser application 108 accesses the first web resource 120 by means described above. Generally speaking, as part of accessing the first web resource 120, the browser application 108 transfers a Hypertext Transfer Protocol (HTTP) request message to the web server 118. For example, where the browser application 108 accesses the first web resource 120 having a URL of www.example.org, the HTTP request message comprises the following request:

GET /index.html HTTP/1.1
Host: www.example.org

At step 204, in response to receiving the HTTP request message from the browser application 108, the web server 118 determines whether the browser application 108 has previously been assigned a unique browser ID 140 (depicted in FIG. 1 applicable for those cases where the unique browser ID 140 has been assigned).

In some non-limiting embodiments of the present technology, the unique browser ID 140 is a cookie of the web analytic application 134, and is stored within the permanent storage 104 of the electronic device 102 (as shown in FIG. 1). In other embodiments, the unique browser ID 140 is a proprietary cookie of the web analytic application 134, and is stored within the permanent storage 104 of the electronic device 102 (as shown in FIG. 1). Unlike HTTP cookies, the unique browser ID 140 does not have an expiration time and is not deleted when the session is expired. As it will be explained in further detail herein below, the unique browser ID 140 allows the web analytic application 134 to determine whether two distinct accesses to the first web resource 120 belong to the same browser application 108.

If it is determined that the browser application 108 does not have a unique browser ID, the process moves to step 206 where a unique browser ID is assigned to the browser application 108 by the source code 138. More precisely, the source code 138 is configured to create and assign the unique browser ID 140 based on a hash function that ensures that the unique browser IDs 140 created and assigned are unique. Continuing with the above example, the web server 118 sends to the browser application 108 the following instructions to store the unique browser ID 140 within the permanent storage 104 of the electronic device 102 (the unique browser ID 140 is referred to as "yandexuid"):
HTTP/1.0 200 OK
Content-type: text/html
Set-Cookie: ExampleORGcookie=<value>
Set-Cookie: yandexuid=<value>

Alternatively, if it is determined that the browser application 108 has already been assigned the unique browser ID 140, the process proceeds to step 208 where a browsing session of the first web resource 120 by the browser application 108 is initiated, and as a result, the counter code is executed. Generally speaking, when the counter code is executed, the source code 138 is configured to gather information about the browsing session, such as the HTML page title, the URL of the first web resource 120, the time of the browsing session, and so on. In some non-limiting embodiments of the present technology, the source code 138 monitors events that occur while the user (not depicted) of the browser application 108 interacts with the first web resource 120. This includes the user behavior, such as for examples, filing in and submitting forms, clicking links, scrolling, and the like.

Once the browsing session of the first web resource 120 by the browser application 108 is terminated, the process proceeds to step 210, where the source code 138 causes the web server 118 to transmit the following information to the web analytic application 134:
an indication of the unique browser ID 140;
the URL of the accessed web resource (such as the first web resource 120);
the access time of the accessed web resource by the browser application 108, and
the monitored user behavior.

The web analytic application 134 is configured to reorganize the received information to generate navigational history data 302. Broadly speaking, the navigational history data is a logically organized set of information received from the web server 118 (as further explained with reference to FIG. 3 below).

Needless to say, the tracking database 136 may be populated according to other techniques, such as those known to those of ordinary skill in the art. Examples of various techniques for populating the tracking database 136 are described in more details at www.metrica.yandex.com, the content if which is hereby incorporated by reference in its entirety.

With reference to FIG. 3, there is depicted a non-limiting schematic illustration of the navigational history data 302 of the browser application 108 in the form of an index stored within the tracking database 136. The navigational history data 302 consists of the (i) access time 306 for each of the at least one web resource accessed, and serviced by the web analytic application 134, and (ii) a set of URLs 304 for each of the at least one web resource, organized chronologically based on the respective access time 306.

As illustrated, it is shown that the browser application 108 (which is associated with the unique browser ID 140) has accessed at least 14 web resources that are serviced by the web analytic application 134 during a period of time ranging from May 19, 2017 and May 20, 2017. Needless to say, the period of time shown in FIG. 3 is for illustration purposes only and is not limitative.

Accessing the Web Service

Attention is now turned back to FIG. 1. As stated previously, the web service 142 is accessible by the browser application 108. In order to access the web service 142, the browser application 108 transmits a data packet 144 (described below) to the server 124.

The data packet 144 comprises the HTTP request (as described above). In some non-limiting embodiments of the present technology, where the electronic device 102 has previously been assigned the unique browser ID 140, the data packet 144 further comprises an indication of the unique browser ID 140. Alternatively, the server 124 may request the unique browser ID 140 in response to receiving the data packet 144. Naturally, the data packet 144 may contain other types of data, without departing from the scope of the present technology.

In some non-limiting embodiments of the present technology, upon receiving the data packet 144, the server 124 is configured to transmit the requested content and one or more targeted content items (described below). Needless to say, it is contemplated that the one or more targeted content items are transmitted in response to the user of the browser application 108 requesting targeted content items after having accessed the web service 142.

As such, the server 124 is configured to maintain a targeted content item database 130 comprising at least one targeted content item 148. In the context of the present technology, the term "targeted content item" will depend on the type of service offered by the web service 142. As such, in some non-limiting embodiments of the present technology, the targeted content item 148 may include a web resource directed to a product advertisement (such as a banner ad) in the case of a web shopping service, a news article in the case of the news service, an event or group in the case of the social media service, a web publication in the case of the personalized content recommendation service. Needless to say, it is also contemplated that the the targeted content items be one specific type of content regardless of the web service 142.

Content Delivery Application 132

In developing the present technology, developers noted that by analyzing the navigational history data 302 of the browser application 108, a better insight of the user's characteristics can be obtained (described below), which could then be used to select one or more "personalized" targeted content items that are likely to be of an affinity to the user.

Now, the server 124 is configured to execute a content delivery application 132 stored within the server memory 126. As described below in more detail, the content delivery application 132 comprises a set of computer-readable codes executable by the server processor 128 to determine which targeted content item to select for transmission to the browser application 108. Although the content delivery application 132 is depicted as being implemented by the server 124, it is not limited, and as such may be implemented (with the targeted content item database 130) by a different entity.

Figure 4:
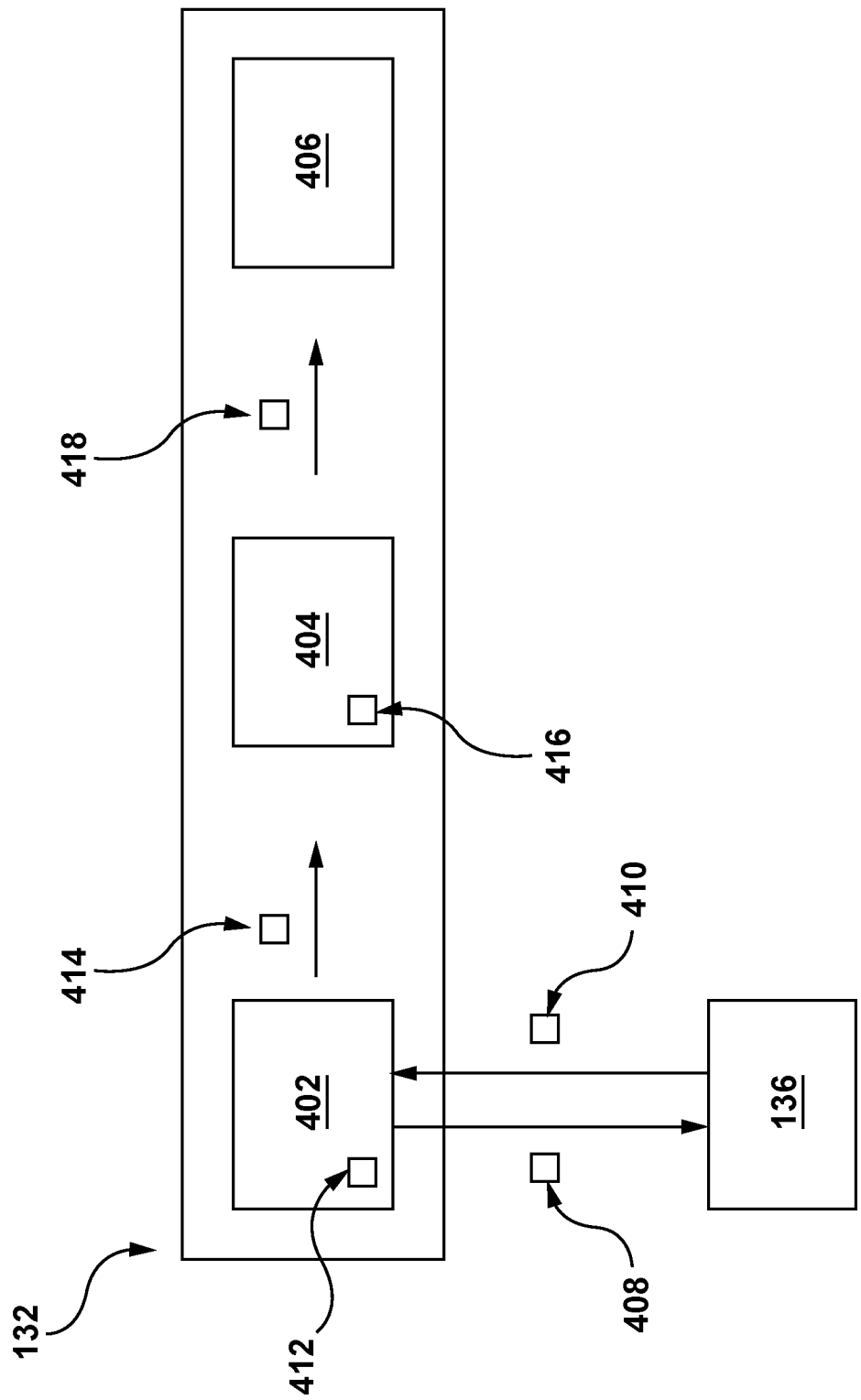
FIG. 4 depicts an example of a process of determining one or more targeted content items stored within the targeted content item database by the content delivery application of the system of FIG. 1.

Functions and operations of the various components of the content delivery application 132 are now described in greater details. With reference to FIG. 4, there is depicted an example of a process of determining one or more targeted content items stored within the targeted content item database 130 by the content delivery application 132 to be delivered to the browser application 108. The content delivery application 132 executes (or otherwise has access to): a vector building routine 402, a profile building routine 404 and a targeted content item selection routine 406.

In the context of the present specification, the term "routine" refers to a subset of the computer-readable codes of the content delivery application 132 that is executable by the server processor 128 to perform the functions explained below. For the avoidance of doubt, it should be expressly understood that the vector building routine 402, the profile building routine 404 and the targeted content item selection routine 406 are depicted schematically herein in a separate and distributed manner for ease of illustration of the processes executed by the content delivery application 132. It is contemplated that some or all of the vector building routine 402, the profile building routine 404 and the targeted content item selection routine 406 may be implemented as one or more combined routines.

Starting with a general overview, determining which targeted content item (such as the targeted content item 148) to retrieve from the targeted content item database 130 can be broadly separated into two steps. At a first step, executed by the vector building routine 402 and the profile building routine 404, the content delivery application 132 analyzes the navigational history data 302 to generate a navigational profile value (described below). At a second step, executed by the targeted content item selection routine 406, one or more targeted content items are selected from the targeted content item database 130 using at least in part, the previously determined navigational profile value.

Functionalities of each of the vector building routine 402, the profile building routine 404 and the targeted content item selection routine 406, as well as data and/or information processed or stored therein is described below.
Vector Building Routine 402

Now, in response to the server 124 receiving the data packet 144 together with the unique browser ID 140, the vector building routine 402 is configured to transmit a data packet 408 to the tracking database 136. In some non-limiting embodiments of the present technology, the data packet 408 comprises a request for the navigational history data 302 that is associated with the unique browser ID 140, and as such includes (i) an indication of the unique browser ID 140, and (ii) an indication of a pre-determined time period for which the navigational history data 302 is sought for (such as, the past day, the past week, the past month, and the like). For example, the data packet 408 comprises a request for the navigational history data 302 associated with the unique browser ID 140 for the past 2 days (i.e. period of time between May 19, 2017 and May 20, 2017).

Upon receiving the data packet 144, the tracking database 136 acquires the indication of the unique browser ID 140 and retrieves the navigational history data 302 associated with the unique browser ID 140, for the requested time period. The tracking database 136 then transmits a data packet 410 which comprises the navigational history data 302 associated with the unique browser ID 140 (see FIG. 3).

The vector building routine 402 is configured to, upon receiving the navigational history data 302, sort the set of URLs 304 chronologically (if not previously done), and parse the URLs forming the set of URLs 304 (see FIG. 3), into one or more navigational session transition patterns. In some non-limiting embodiments of the present technology, the navigational session transition pattern is indicative of the interactions made within a browsing session defined by a period of time starting with a connection to the communication network 114 by the browser application 108 for the purpose of browsing the Internet, and terminating with a disconnection from the communication network 114. As such, the manner in which the parsing of the set of URLs 304 is done is not limited, and may be done by any manner, such as by grouping URLs having a similar access time or having been accessed in a predefined time interval (such as applying a predetermined time period mask, such as 10 minutes, to the set of URLs 304).

Referring to FIG. 5, there is depicted a set of navigational session transition patterns (a first navigational session transition pattern 502, a second navigational session transition pattern 512, a third navigational session transition pattern 514, a fourth navigational session transition pattern 516, and a fifth navigational session transition pattern 518). The first navigational session transition pattern 502 comprises a subset of URLs of the set of URLs 304 determined to belong to the same navigational session transition pattern as a result of the parsing. As such, the first navigational session transition pattern 502 includes a first URL 504, a second URL 506, a third URL 508 and a fourth URL 510.

Taking the first navigational session transition pattern 502 as an example, let us assume that the URLs contained therein are the following:

TABLE 1

| First URL 504 | http://news.yandex.ru |
| Second URL 506 | http://www.cnn.com |
| Third URL 508 | http://www.cnn.com/us/index.html |
| Fourth URL 510 | http://www.asahi.com |

The vector building routine 402 is first configured to apply a set of rules to truncate the URLs contained within the first navigational session transition pattern 502 to obtain a URL segment comprising a set of sequential letters (described below). As such, the vector building routine 402 may be configured to remove at least one of:

a first portion corresponding to a hypertext transfer protocol (e.g. "http://");

a second and third portion corresponding to a path name and file name (e.g. the "/us" and "/index.html" in the third URL 508); and a fourth portion corresponding to the top level domain name (e.g. the ".com" and ".ru").

In a further example, the vector building routine 402 may also be configured to remove a fifth portion, corresponding to a hostname, provided that the hostname corresponds to "www". This is based on the developers' appreciation that although most web resources are served from the host named "www" (such as http://www.yahoo.com), many web services run other hosts. For example Yahoo!™ also runs other hosts including those named "finance" (finance.yahoo.com), "sports" (sports.yahoo.com), and "games" (games.yahoo.com).

As such, it could generally be stated that the URL segment corresponds to a second level domain name and its subdomains, and in some instances, the hostname (provided that it is different from "www"). As a result of applying the above mentioned set of rules, the URL segment of the first URL 504 will result in "news.yandex", the URL segment of the second URL 506 will result in "cnn", the URL segment of the third URL 508 will also result in "cnn", and the URL segment of the fourth URL 510 will result in "asahi".

The vector building routine 402 is then configured to remove any successive duplicate URL segments contained within the first navigational session transition pattern 502. As such, the URL segments associated with the third URL 508 ("cnn") is discarded from the first navigational session transition pattern 502. As a result, the first navigational session transition pattern 502 will contain the three sequential URL segments: "news.yandex", "cnn" and "asahi".

The vector building routine 402 is further configured to generate a vector value for each of the URL segments of the remaining URLs (i.e. "news.yandex", "cnn", and "asahi") using a first machine learning algorithm 412. In some non-limiting embodiments of the present technology, the vector value is a vector representation of the corresponding URL segment within a multi-dimensional space representing a given navigational session transition patterns.

In some non-limiting embodiments of the present technology, the first machine learning algorithm 412 executes a word2vec based algorithm. As such, the word2vec based algorithm is trained to project the given URL segment into the multi-dimensional space such that the URL segments occurring within the same navigational session transition pattern are projected in proximity to each other in the multi-dimensional space.

The manner in which the first machine learning algorithm 412 is trained will now be explained. For convenience, the training will be described as being performed by the server 124, but it is not intended to be limitative.

At a first step, the server 124 receives a set of sample navigational history data associated with different users. The manner in which the server 124 receives the set of sample is not limited. For example, the different users may be users of the web service 142, and as such the set of sample navigational history data may be obtained using the web analytic application 134, as described above.

At a second step, the server 124 parses each of the sample navigational history data into one or more sample navigational session transition patterns, and performs the truncating of each of the URLs contained therein to obtain URL segments using the method described above.

Using the URL segments for each navigational session transition pattern, the first machine learning algorithm 412 is trained. More precisely, each URL segments (for a given navigational session transition pattern) is inputted into the first machine learning algorithm 412. The first machine learning algorithm 412 is configured to analyze the sequences of the URL segments inputted within the multi-dimensional space, and generate the vector values based on a co-occurrence of the URL segments within the navigational session transition pattern. As such, once trained, the first machine learning algorithm 412 can receive URL segments of a new navigational session transition pattern and generate the vector values for each URL segments contained therein.

It is to be noted that the truncating of the URLs is based on a few observations made by the developers. For example, developers observed that unlike the prior art solutions of determining targeted content items based on the content of the visited web resources or user interactions executed with these web resources (such as payments), a similar goal is achieved without requiring such granularity, mainly by focusing primarily on the URL segments and their spatial relationships as vectors to represent the navigational characteristics of the user (as described in more detail below). As such, it is contemplated that the solution presented by the present technology will likely be less expensive in terms of computing resources when compared to the prior art solutions, as embodiments of the present technology disclosed herein require processing less data compared to the prior art approaches.

Profile Building Routine 404

As part of generating the navigational profile value, the vector building routine 402 is further configured to transmit a data packet 414 to the profile building routine 404. In some non-limiting embodiments of the present technology, the data packet 414 comprises an indication of the vector value for each URLs of the set of URLs 304.

The profile building routine 404 is configured to determine a navigational profile value for the user associated with the browser application 108. In some non-limiting embodiments of the present technology, the navigational profile value is a vector representation of the corresponding user's navigational characteristics within a multidimensional space.

The manner in which the navigational profile value is calculated is now explained. In some non-limiting embodiments of the present technology, the profile building routine 404 is configured to determine an adjusted vector value for each vector values. That is, the profile building routine 404 adjusts the vector values to obtain a better vector representation reflecting the context of the navigational history data 302 as well as other factors (described below). The adjusted vector value is determined using:

$$V_{adjusted} = V_{host} \times W \times N \qquad \text{Equation 1}$$

Within Equation 1, $V_{adjusted}$ is the adjusted vector value for a given vector value;
$V_{host}$ is the given vector value;
W is a weight value associated with the given vector value (described below);
N is a number of occurrence for the URL segment associated with the given vector value in the navigational history data 302;

In some non-limiting embodiments of the present technology, the weight value is indicative of a first value being inversely proportional to a frequency of the given URL segment in a log (described below) of URL segments associated with URLs visited by users of the web service 142.

In developing the present technology, developers noted that some URL segments are so commonly used (such as "yandex", "google"), such that the number of occurrence (i.e. the "N" in Equation 1) would incorrectly be emphasized, without giving enough weight to more scarce URL segments. As such, there was a need to adjust the emphasis using the weight value (described below).

Hence, the server 124 is configured to have access to a plurality of navigational history data records associated with a plurality of browser applications having previously accessed the web service 142 (using the method described above), and as such comprises the log (not depicted), of the URL segments contained with the plurality of navigational history data. The first value associated with the given vector value is determined by the profile building routine 404 (or alternatively, the vector building routine 402). More precisely, the profile building routine 404 generates the first value based on an inversely proportional relationship to a frequency of the URL segment within the log (not depicted). As such, URL segments that occur rarely within the log would have a higher first value compared to URL segments occurring frequently.

In some embodiment, the weight value is, in addition or alternatively to the first value, a second value being based on a recentness of access to the URL associated with the given URL segment by the browser application 108. As such, based on the access time 306, URL segments that are associated with URLs that have been accessed more recently by the browser application 108 would have a higher second value compared to URL segments associated with URLs that have been accessed previously.

The navigational profile value is the sum of all the adjusted vector values that have been determined for the navigational history data 302. As such, it could be said that the navigational profile value is determined using:

$$V_{profile} = \Sigma V_{adjusted} \quad \text{Equation 2}$$

Within Equation 2, $V_{profile}$ is the navigational profile value.

In other words, using both Equation 1 and Equation 2, the profile building routine 404 is configured to determine the navigational profile value using:

$$V_{profile} = \Sigma_{i=1}^{x}(V_i \times W \times N) \quad \text{Equation 3}$$

Within Equation 3,
X is a total number of vector values associated with the navigational history data 302;
$V_i$ is a given vector value contained within the navigational history data 302; and
i is an integer.

The obtained navigational profile value is indicative of the navigational characteristics of the user of the browser application 108 (as a vector), and is used for generating a user-personalization interest parameter. In some non-limiting embodiments of the present technology, the user personalization interest parameter is a vector indicative of the personal characteristics of the user, which are used for the purpose of determining the affinity, or interest, of a given content item to the user (as described in more detail below). For example, the user-personalization interest parameter may include, at least one of, but not limited to, the following socio-demographic features:

an age range of the user;
an income range of the user;
a regional position of the user; and
gender of the user.

The profile building routine 404 is configured to execute a second machine learning algorithm 416 (described below) trained for determining the user-personalization interest parameter of the user. The manner in which the second machine learning algorithm 416 is implemented is not limited, and may be, for example, a decision-tree algorithm or a neural network system.

Figure 7:
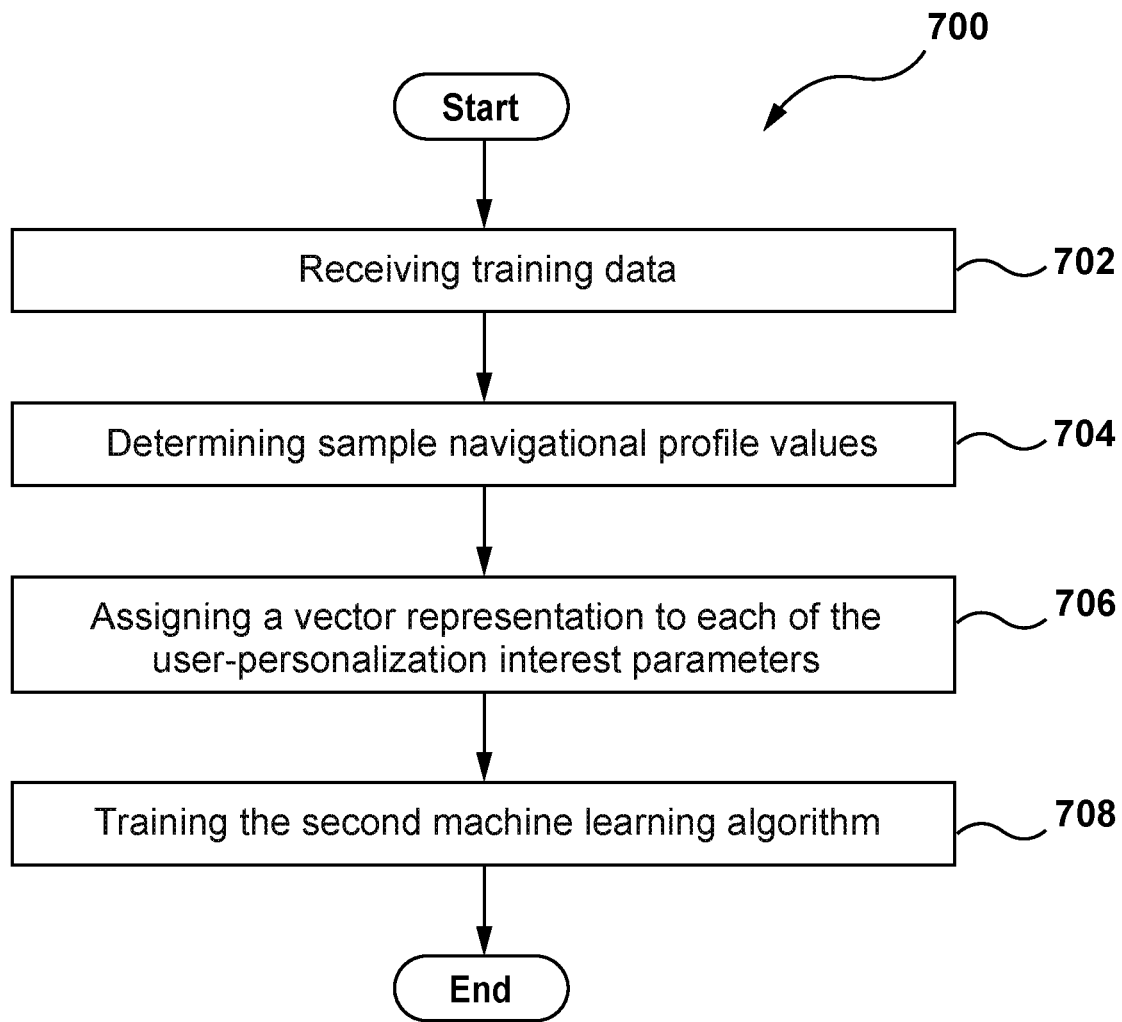
FIG. 7 depicts a block diagram of a flow chart of a method for training a second machine learning algorithm of the content delivery application of FIG. 4.

Referring to FIG. 7, there is depicted a block diagram of a flow diagram of an example method 700 for training the second machine learning algorithm 416. For convenience, the method 700 will be described as being performed by the server 124, but it is not intended to be limitative.

At step 702, the server 124 receives a training data comprising (i) a plurality of sample navigational history data associated with a plurality of sample users, and (ii) the user-personalization interest parameters (such as the one or more socio-demographic features) known to each of the sample users. The manner in which the server 124 receives the training data is not limited. For example, the sample users may correspond to the different users previously used for training the first machine learning algorithm 412, and the corresponding user-personalization interest parameters may be obtained via question polls, registration forms and the like completed by the plurality of users.

At step 704, the server 124 determines sample navigational profile values for each of the sample navigational history data received in step 702. The manner in which the sample navigational profile values are determined is not limited, and may be determined using at least the first machine learning algorithm 412 as described above.

At step 706, the server 124 assigns a vector representation to each of the user-personalization interest parameters of the sample users received in step 702. The manner in which the assigning of the vector representation is done is not limited. Taking the one or more socio-demographic features as an example, the server 124 may be configured to assign a pre-determined vector representation to each of the socio-demographic features. For example, if a given sample user is a female, the server 124 is configured to assign a vector representation X, and if a male, the server 124 is configured to assign a vector representation Y.

At step 708, the second machine learning algorithm 416 is trained. More precisely, each of the sample navigational profile values and its respective user-personalization interest parameters are inputted into the second machine learning algorithm 416. The second machine learning algorithm 416 is configured to determine a relationship between each of the sample navigational profile values and its respective user-personalization interest parameters, to generate, as part of the training, a machine generated formula indicative of the relationship. As such, once trained, the second machine learning algorithm 416 can receive a new navigational profile value to determine the user personalization interest parameter of the user associated with the new navigational profile value by using the machine generated formula.

Targeted Content Item Selection Routine 406

Having executed step 1 (i.e. determining the user-personalization interest parameter), the content delivery application 132 moves to step 2, in which the one or more targeted content items are selected.

As such, the profile building routine 404 is further configured to transmit a data packet 418, comprising the user-personalization interest parameter previously determined, to the targeted content item selection routine 406.

Upon receiving the data packet 418, the targeted content item selection routine 406 is configured to access the targeted content item database 130 to determine one or more targeted content items (such as the targeted content item 148) to be transmitted to the browser application 108 for display.

In some non-limiting embodiments of the present technology, each of the targeted content items stored within the targeted content item database 130 has one or more item feature vectors previously determined by an operator of the web service 142. In some non-limiting embodiments of the present technology, each of the one or more item feature vectors represents a vector representation of the corresponding targeted content item projected within a multi-dimensional space grouping a set of targeted content items.

Taking an electronic ad banner for a handbag as the targeted content item 148 as an example, the corresponding item feature vector may be based on the assessment, by the operator of the web service 142 (or alternatively, the provider of the advertisement), that the given handbag is destined primarily to (i) a female user; (ii) aged between 20-25; (iii) with an income range of $100,000 or more; and (iv) living in a city.

The targeted content item selection routine 406 is configured to map the user-personalization interest parameter into the multi-dimensional space grouping the set of targeted content items and match the item feature vectors with the user-personalization interest parameter. More precisely, the user-personalization interest parameter is projected into the multi-dimensional space and the target content item 406 is configured to identify a predetermined number of targeted content items located in a pre-determined proximity to the user personalization interest parameter.

Referring back to FIG. 1, once the targeted content item selection routine 406 has determined the one or more targeted content items, the server 124 is configured to transmit a data packet 146 to the browser application 108. In some non-limiting embodiments of the present technology, the data packet 146 comprises (i) a content of the web service 142 in response to the HTTP request previously submitted via the data packet 144; and the one or more targeted content items determined by the targeted content item selection routine 406 for display by the electronic device 102.

In some embodiments where the web service 142 is the personalized content recommendation service such as Yandex.Zen™ or Flipboard™, the data packet 146 comprises only the one or more targeted content items determined by the targeted content item selection routine 406 for display by the electronic device 102.

Naturally, the data packet 146 may contain other types of data, without departing from the scope of the present technology.

Figure 6:
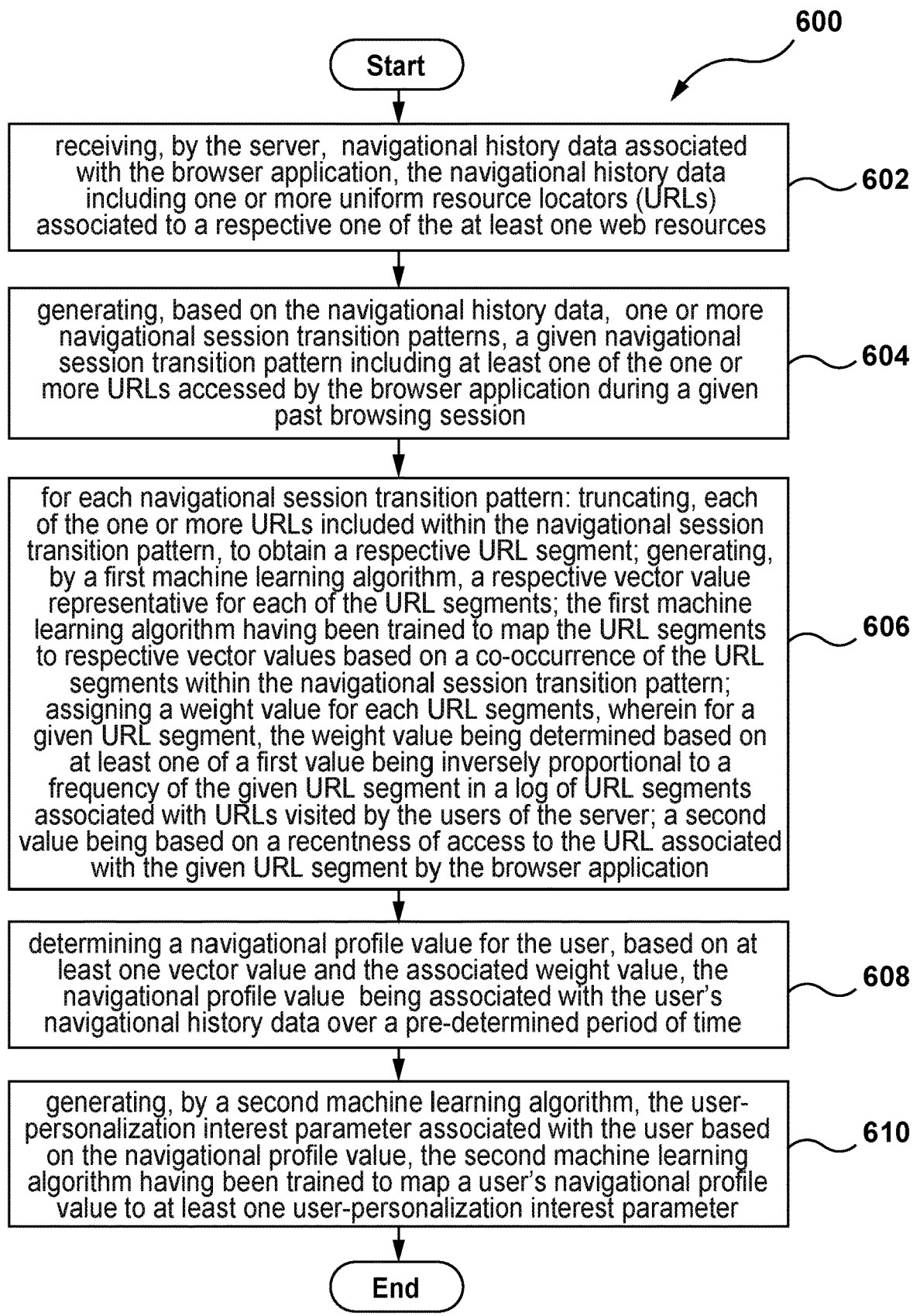
FIG. 6 depicts a block diagram of a flow chart of a method for determining the user-personalization interest parameter for identifying personalized targeted content items.

Given the architecture and examples provided herein above, it is possible to execute a computer-implemented method of determining user-personalization interest parameter and providing targeted content items accordingly. With reference to FIG. 6, there is depicted a flow chart of a method 600, the method 600 being executable in accordance with non-limiting embodiments of the present technology. The method 600 can be executed by the server 124.

Step 602—receiving, by the server, navigational history data associated with the browser application, the navigational history data including one or more uniform resource locators (URLs) associated to a respective one of the at least one web resources.

The method 600 starts at step 602, where the server 124 receives the data packet 410 which comprises the navigational history data 302 associated with the unique browser ID 140.

The data packet 410 is received in response to the user of the browser application 108 accessing the web service 142 (via the data packet 144), and the vector building routine 402 requesting the navigational history data 302 associated with the unique browser ID 140 contained within the data packet 144.

Although the data packet 410 is received "server-side" (i.e. by the tracking database 136), it is further contemplated that the navigational history data 302 is received "client-side" (i.e. from the electronic device 102), together with the data packet 144. In the latter case, the navigational history data 302 corresponds to a browsing history log stored by the browser application 108.

Step 604—generating, based on the navigational history data, one or more navigational session transition patterns, a given navigational session transition pattern including at least one of the one or more URLs accessed by the browser application during a given past browsing session.

At step 604, the vector building routine 402 is configured to, parse the URLs forming the set of URLs 304, into one or more navigational session transition patterns (such as the first navigational session transition pattern 502).

The manner in which the parsing of the set of URLs 304 is done is not limited, and may be done by any manner, such as by grouping URLs having a similar access time or accessed in a predefined time interval (such as grouping the URLs that have been accessed within 10 minutes).

Step 606—for each navigational session transition pattern: truncating, each of the one or more URLs included within the navigational session transition pattern, to obtain a respective URL segment; generating, by a first machine learning algorithm, a respective vector value representative for each of the URL segments; the first machine learning algorithm having been trained to map the URL segments to respective vector values based on a co-occurrence of the URL segments within the navigational session transition pattern; assigning a weight value for each URL segments, wherein for a given URL segment, the weight value being determined based on at least one of a first value being inversely proportional to a frequency of the given URL segment in a log of URL segments associated with URLs visited by users of the server; a second value being based on a recentness of access to the URL associated with the given URL segment by the browser application.

At step 606, the vector building routine 402 is configured to execute two functions on each of the one or more navigational session transition patterns.

Firstly, for each navigational session transition pattern, the vector building routine 402 is configured to truncate the URLs contained therein so as to obtain a respective URL segment comprising a set of sequential letters. In some non-limiting embodiments of the present technology, the URL segment corresponds to the second level domain name and its subdomains, and in some instances, the hostname (provided that it is different from "www").

Secondly, using the first machine learning algorithm 412, vector values for each of the URL segments contained within the given navigational session transition pattern are determined. The first machine learning algorithm 412 has been previously trained to map the URL segments to respective vector values based on the co-occurrence of the URL segments within the navigational session transition pattern.

The vector building routine 402 is further configured to transmit the data packet 414 comprising the indication of the vector values for each URL segments to the profile building routine 404.

The profile building routine 404 is configured to determine the weight value. The weight value comprises at least one of: (i) the first value being inversely proportional to a frequency of the given URL segment in the log of URL segments associated with URLs visited by users of the web service 142; and (ii) the second value being based on a recentness of access to the URL associated with the given URL segment by the browser application 108.

Step 608—determining a navigational profile value for the user, based on at least one vector value and the associated weight value, the navigational profile value being associated with the user's navigational history data over a pre-determined period of time.

At step 608, the profile building routine 404 is configured to determine the navigational profile value for the user associated with the browser application 108 based on the one or more vector values. In some non-limiting embodiments of the present technology, the profile building routine 404 is configured to determine the adjusted vector value for each vector values. That is, the profile building routine 404 adjusts the vector values to obtain a better vector representation reflecting the context of the navigational history data 302 as well as other factors (described below). The adjusted vector value is determined using:

$$V_{adjusted} = V_{host} \times W \times N \qquad \text{Equation 1}$$

Within Equation 1, $V_{adjusted}$ is the adjusted vector value for a given vector value;

$V_{host}$ is the given vector value;

W is a weight value associated with the given vector value determined previously;

N is a number of occurrence for the URL segment associated with the given vector value in the navigational history data 302;

The navigational profile value is the sum of all the adjusted vector values that have been determined for the navigational history data 302. As such, it could be said that the navigational profile value is determined using:

$$V_{profile} = \Sigma V_{adjusted} \quad \text{Equation 2}$$

Within Equation 2, $V_{profile}$ is the navigational profile value.

In other words, using both Equation 1 and Equation 2, the profile building routine 404 is configured to determine the navigational profile value using:

$$V_{profile} = \Sigma_{i=1}^{x}(V_i \times W \times N) \quad \text{Equation 3}$$

Within Equation 3,

X is a total number of vector values associated with the navigational history data 302;

$V_i$ is a given vector value contained within the navigational history data 302; and i is an integer.

Step 610—generating, by a second machine learning algorithm, the user-personalization interest parameter associated with the user based on the navigational profile value, the second machine learning algorithm having been trained to map a user's navigational profile value to at least one user-personalization interest parameter.

At step 610, the profile building routine 404 is configured to determine the user-personalization interest parameter using the second machine learning algorithm 416. More precisely, the navigational profile value previously obtained is fed into the second machine learning algorithm 416 that has been previously trained to determine the user-personalization interest parameter.

In some non-limiting embodiments of the present technology, the user-personalization interest parameter is indicative of one or more socio-demographic features, the one or more socio-demographic features comprising at least one of:

the age range of the user;

the income range of the user;

the regional position of the user; and the gender of the user.

In some non-limiting embodiments of the present technology, the determined user-personalization interest parameter is used to determine one or more targeted content items from the targeted content item database 130 to be presentable to the user of the electronic device 102.

It should be apparent to those skilled in the art that at least some embodiments of the present technology aim to expand a range of technical solutions for addressing a particular technical problem, namely determining the user-personalization interest parameter for identifying one or more targeted content items in a more efficient manner, thus improving energy consumption and decreasing computational burden on the server 124.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer implemented method of generating a user-personalization interest parameter, the method being executable on a server coupled to, via a communication network, a client device associated with a user, the client device configured to execute a browser application having previously accessed, via the communication network, at least one web resource during a pre-determined past period of time;

the method comprising:

receiving, by the server, navigational history data associated with the browser application, the navigational history data including one or more uniform resource locators (URLs) associated to a respective one of the at least one web resources;

generating, based on the navigational history data, one or more navigational session transition patterns, a given navigational session transition pattern including at least one of the one or more URLs accessed by the browser application during a given past browsing session;

for each navigational session transition pattern:

truncating each of the one or more URLs included within the navigational session transition pattern to obtain a respective URL segment;

generating, by a first machine learning algorithm, a respective vector value representative for each of the URL segments;

the first machine learning algorithm having been trained to map the URL segments to respective vector values based on a co-occurrence of the URL segments within the navigational session transition pattern;

assigning a weight value for each URL segment, wherein for a given URL segment, the weight value being determined based on at least one of a first value being inversely proportional to a frequency of the given URL segment in a log of URL segments associated with URLs visited by users of the server;

a second value being based on a recentness of access to the URL associated with the given URL segment by the browser application;

determining a navigational profile value for the user, based on at least one vector value and the associated weight value, the navigational profile value being associated with the user's navigational history data over a pre-determined period of time; and generating, by a second machine learning algorithm, the user-personalization interest parameter associated with the user based on the navigational profile value, the second machine learning algorithm having been trained to map a user's navigational profile value to at least one user-personalization interest parameter.

2. The method of claim 1, wherein truncating each of the one or more URLs comprises discarding at least one of:
   a first portion indicative of a hypertext transfer protocol for each of the one or more URLs;
   a second portion indicative of a path name for each of the one or more URLs;
   a third portion indicative of a file name for each of the one or more URLs;
   a fourth portion indicative of a top-level domain name for each of the one or more URLs; and
   a fifth portion indicative of a hostname, upon determination that the hostname is a world wide web (www) hostname.

3. The method of claim 1, wherein the navigational history data further comprises an access time for each of the one or more URLs by the browser application, the one or more URLs having been previously stored in an order in accordance with the access time resulting in a list of URLs being chronologically organized.

4. The method of claim 3, wherein generating the one or more navigational session transition patterns comprises parsing the chronologically sorted one or more URLs into the one or more navigational sessions based on its respective access times.

5. The method of claim 4, wherein parsing comprises applying a pre-determined period of time mask.

6. The method of claim 1, wherein the first machine learning algorithm executes a word2vec based algorithm.

7. The method of claim 6, wherein the word2vec based algorithm is trained to project the URL segment into a multi-dimensional space such that the URL segments occurring within the same navigational session transition pattern are projected in proximity to each other in the multi-dimensional space.

8. The method of claim 1, wherein determining the navigational profile value comprises:
   determining for each vector value associated with the navigational history data, a respective adjusted vector value, the respective adjusted vector value being calculated using an equation:

$$V_{adjusted} = V_{host} \times W \times N$$

where:
   $V_{adjusted}$ is the adjusted vector value for a given vector value;
   $V_{host}$ is the given vector value;
   W is the weight value associated with the given vector value;
   N is a number of occurrence for the domain level name associated with the given vector value in the navigational history data; and
   adding each of the determined adjusted vector values to obtain the navigational profile value.

9. The method of claim 1, wherein the user-personalization interest parameter comprises one or more socio-demographic features, the one or more socio-demographic features comprising at least one of:
   an age range of the user;
   an income range of the user;
   a regional position of the user; and
   gender of the user.

10. The method of claim 1, wherein the server is configured to maintain a web service accessible by the browser application.

11. The method of claim 10, wherein receiving the navigational history data associated with the browser application is executed in response to the browser application accessing the web service.

12. The method of claim 11, wherein the server further comprises a content database, the content database comprising one or more targeted content items, and wherein the method further comprises:
   determining, based on the user-personalization interest parameter, one or more targeted content items; and
   transmitting, the one or more targeted content items to the client device for display.

13. The method of claim 12, wherein each of the one or more targeted content items has an associated item feature vector, and wherein determining the one or more targeted content items comprises matching the item feature vectors with the user-personalization interest parameter.

14. The method of claim 13, wherein matching the item feature vectors with the user-personalization interest parameter comprises projecting the item feature vectors and the user-personalization interest parameter into a second multi-dimensional space and identifying targeted content items located in a pre-determined proximity to the user-personalization interest parameter.

15. The method of claim 12, wherein the one or more targeted content items comprise a banner ad.

16. A server coupled to a client device associated with a user via a communication network, the client device configured to execute a browser application having previously accessed, via the communication network, at least one web resource during a pre-determined past period of time, the server comprising:
   a network interface for communicatively coupling to the communication network;
   a processor coupled to the network interface, the processor configured to:
      receive, by the server, navigational history data associated with the browser application, the navigational history data including one or more uniform resource locators (URLs) associated to a respective one of the at least one web resources;
      generate, based on the navigational history data, one or more navigational session transition patterns, a given navigational session transition pattern including at least one of the one or more URLs accessed by the browser application during a given past browsing session;
      for each navigational session transition pattern:
         truncate each of the one or more URLs included within the navigational session transition pattern to obtain a respective URL segment;
         generate, by a first machine learning algorithm, a respective vector value representative for each of the URL segments;
         the first machine learning algorithm having been trained to map the URL segments to respective vector values based on a co-occurrence of the URL segments within the navigational session transition pattern;
      assign a weight value for each URL segment, wherein for a given URL segment, the weight value being determined based on at least one of a first value being inversely proportional to a frequency of the given URL segment in a log of URL segments associated with URLs visited by users of the server;

a second value being based on a recentness of access to the URL associated with the given URL segment by the browser application;

determine a navigational profile value for the user, based on at least one vector value and the associated weight value, the navigational profile value being associated with the user's navigational history data over a pre-determined period of time; and generate, by a second machine learning algorithm, the user-personalization interest parameter associated with the user based on the navigational profile value, the second machine learning algorithm having been trained to map a user's navigational profile value to at least one user-personalization interest parameter.

17. The server of claim 16, wherein to truncate each of the one or more URLs, the processor is configured to discard at least one of:

a first portion indicative of a hypertext transfer protocol for each of the one or more URLs;

a second portion indicative of a path name for each of the one or more URLs;

a third portion indicative of a file name for each of the one or more URLs;

a fourth portion indicative of a top-level domain name for each of the one or more URLs; and a fifth portion indicative of a hostname, upon determination that the hostname is a world wide web (www) hostname.

18. The server of claim 16, wherein:

the navigational history data further comprises an access time for each of the one or more URLs by the browser application, the one or more URLs having been previously stored in an order in accordance with the access time resulting in a list of URLs being chronologically organized; and to generate the one or more navigational session transition patterns, the processor is configured to:

parse the chronologically sorted one or more URLs into the one or more navigational sessions based on its respective access times.

19. The server of claim 16, wherein the first machine learning algorithm executes a word2vec based algorithm trained to project the URL segment into a multi-dimensional space such that the URL segments occurring within the same navigational session transition pattern are projected in proximity to each other in the multi-dimensional space.

20. The server of claim 16, wherein to determine the navigational profile value, the processor is configured to:

determine for each vector value associated with the navigational history data, a respective adjusted vector value, the respective adjusted vector value being calculated using an equation:

$$V_{adjusted} = V_{host} \times W \times N$$

where:

$V_{adjusted}$ is the adjusted vector value for a given vector value;

$V_{host}$ is the given vector value;

W is the weight value associated with the given vector value;

N is a number of occurrence for the domain level name associated with the given vector value in the navigational history data; and add each of the determined adjusted vector values to obtain the navigational profile value.

* * * * *